United States Patent [19]

Posey, Jr.

[11] 4,367,135
[45] Jan. 4, 1983

[54] PROCESSES

[75] Inventor: Lloyd G. Posey, Jr., Houston, Tex.
[73] Assignee: Monsanto Company, St. Louis, Mo.
[21] Appl. No.: 243,220
[22] Filed: Mar. 12, 1981
[51] Int. Cl.³ .................... C10G 47/00; C10G 49/22
[52] U.S. Cl. ................................ 208/108; 55/16; 208/102
[58] Field of Search .................. 208/108, 102; 55/16

[56] References Cited

U.S. PATENT DOCUMENTS

| | | | |
|---|---|---|---|
| 3,444,072 | 5/1969 | Lehman | 208/102 |
| 3,445,379 | 5/1969 | Hansen | 208/102 |
| 3,546,099 | 12/1970 | Sutherland | 208/102 |
| 3,598,722 | 8/1971 | Carson | 208/102 X |
| 3,962,070 | 6/1976 | Stotler | 208/10 |
| 4,172,885 | 10/1979 | Perry | 423/359 |
| 4,180,552 | 12/1979 | Graham et al. | 423/359 |
| 4,180,553 | 12/1979 | Null et al. | 423/359 |
| 4,230,463 | 10/1980 | Henis et al. | 55/16 |

Primary Examiner—Andrew Metz
Assistant Examiner—G. E. Schmitkons
Attorney, Agent, or Firm—Robert L. Broad

[57] ABSTRACT

Efficient utilization of hydrogen in a hydrocracking system is obtained by recovering in a first gas-liquid separation zone hydrogen by gas-liquid separation of hydrocrackate at a pressure of at least about 75 percent of the pressure in the hydrocracking zone, and recovering in a second gas-liquid separation zone hydrogen from the separated liquid phase from the first gas-liquid separation zone, said second gas-liquid separation zone being at a pressure less than 75 percent of the pressure in the first gas-liquid separation zone and at conditions sufficient to provide a separated vapor phase containing at least about 50 volume percent of hydrogen and having a hydrogen partial pressure of at least about 20 atmospheres. At least a portion of the separated vapor phase from the second gas-liquid separation zone is contacted with the feed side of a polymeric membrane exhibiting a high selectivity to the permeation of hydrogen as compared to the permeation of methane. The opposite side, i.e., permeate side, of the membrane is maintained at a pressure sufficiently below the pressure on the feed side of the membrane such that the ratio of the total pressure on the feed side to total pressure on the permeate side of the membrane is at least about 3:1 to permeate hydrogen to the permeate side of the membrane and provide a hydrogen permeate having a concentration of hydrogen greater than the concentration of hydrogen in the separated vapor phase contacting the membrane. At least a portion of the hydrogen permeate is recycled to the hydrocracking zone. Thus, the second gas-liquid separation zone co-acts with the polymeric membrane separation to provide a highly useable, recovered hydrogen stream in the hydrocracking system.

1 Claim, 1 Drawing Figure

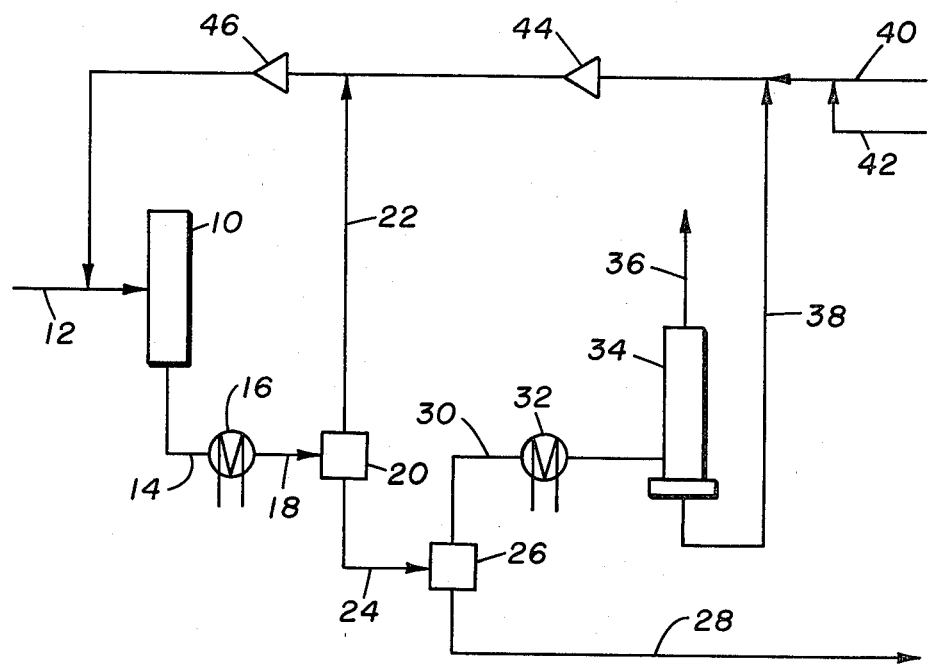

PROCESSES

This invention relates to processes for catalytically hydrocracking a hydrocarbonaceous feed, and particularly, to catalytic hydrocracking processes in which hydrogen is recovered from the hydrockate and is recycled to the hydrocracking zone.

By this invention there are provided processes for hydrocracking hydrocarbonaceous feed stocks which processes exhibit enhanced efficiencies of hydrogen utilization. In accordance with the processes of this invention, the enhanced efficiencies of hydrogen utilization can be achieved with little additional energy consumption over similar hydrocracking processes which do not provide the enhanced efficiencies of hydrogen utilization.

Petroleum crude feed stocks contain a broad range of molecular weight components. Frequently, the heavier fractions of the petroleum crude feed stocks are cracked, i.e., broken down into smaller molecules, in order to provide desirable hydrocarbonaceous products, e.g., for direct consumer use or as a feed to other refinery operations. In recent years a shortage of high grade petroleum crude feed stocks has existed. Petroleum refiners are therefore faced with using lower grade petroleum crude feed stocks which have greater and greater portions of heavy fractions. Accordingly, refiners must effectively use cracking processes in order to use these available petroleum crude feed stocks to make high sought petroleum products. One of the advantageous cracking processes is hydrocracking in which free hydrogen, i.e., atomic or molecular hydrogen, (hereinafter referred to as "hydrogen") is present during a catalytically-promoted cracking process. The hydrogen serves several important functions. The hydrogen can, under certain conditions, react with polycyclic aromatic components which are generally relatively inert to cracking, to convert these polycyclic aromatics to compounds which can crack more readily. The hydrogen can reduce the production of unsaturated hydrocarbons during the hydrocracking process. Moreover, the hydrogen can reduce the formation of tar and coke during the hydrocracking process. Hence, the hydrogen can minimize the production of less saleable by-products as well as minimize the rate of deactivation of the catalyst used to effect the hydrocracking. For example, it has been estimated that a one percent increase in hydrogen purity in a hydrocracker may, under certain conditions, increase the cycle length between hydrocracking catalyst regenerations by about one percent. Also, an increase in hydrogen purity can increase the $C_5^+$ yield from the hydrocracker.

In order to achieve these results, relatively high hydrogen partial pressure must be maintained throughout the hydrocracking reaction zone. Thus, hydrocracking can be an extremely large consumer of hydrogen within a refinery operation, and the hydrogen must be supplied by a source external from the hydrocracker. In many refineries, at least a portion of the hydrogen is provided by the production of hydrogen from a hydrocarbon in a hydrogen plant. Frequently, a significant portion of the hydrogen for hydrocracking is provided by hydrogen-producing operations within the refinery, e.g., catalytic reforming. However, as lower grade petroleum crude feed stocks may need to be used by the refinery not only will a greater portion of the feed stock need to be subjected to hydrocracking to provide the sought petroleum products (thereby requiring an increased hydrocracking throughput and demand for hydrogen), but also the quantity and purity of hydrogen produced during catalytic reforming will usually be decreased. Consequently, an increase in hydrogen production from the hydrogen plant may be necessary. The hydrogen plant, however, diverts valuable hydrocarbons from otherwise more useful forms into the production of hydrogen.

In order to reduce the demand for hydrogen from a hydrogen plant it is generally desired to use the hydrogen not on a once through basis, but rather, to recycle hydrogen to the hydrocracking zone. Accordingly, in most instances, a portion of the hydrogen is recovered from the effluent (hydrockate) from the hydrocracking reaction zone by a gas-liquid separation with the separated vapor phase being recycled to the hydrocracking zone. Generally, in these types of processes, the hydrockate is passed to a high pressure separation zone which may be under substantially the same pressure and temperature as the hydrocracking zone to provide a first vapor phase and a first liquid phase. Alternatively, this high pressure separation zone may be at a substantial lower temperature than the hydrocracking zone but at substantially the same pressure as the hydrocracking zone. The vapor phase obtained from such a high pressure separation zone may contain a significant portion of the hydrogen in the hydrockate and may also have a desirably high concentration of hydrogen. The liquid phase from the high pressure separation zone, however, may still contain substantial amounts of hydrogen.

In view of the significant amounts of hydrogen contained in the liquid phase from the high pressure separator, it may be desirable to recover additional hydrogen from this liquid phase. Lehman in U.S. Pat. No. 3,444,072, issued May 13, 1969, discloses the use of an intermediate flashing of the liquid phase from a high pressure separator in hydrogenation system such as hydrocracking to recover hydrogen from the liquid phase. The pressure of this intermediate flashing is between about 0.20 and 0.75 of the contacting pressure in the hydrogenation zone if one intermediate flashing is used and between about 0.1 and 0.9 of the contacting pressure if multiple intermediate flashes are utilized. The patentee notes that decreasing the pressure of the intermediate flash increases the recovery of hydrogen. However, as the pressure is lowered the energy required to recompress the hydrogen to contacting pressure is increased. Furthermore, decreased pressure also increases the amount of other components, such as light hydrocarbons, which are returned to the contacting system along with the recompressed hydrogen. In addition to increasing the energy requirement for recompression, these impurities either reduce the hydrogen partial pressure in the contacting section or impose an additional burden on a purification system operating to maintain a fixed hydrogen partial pressure. Lehman discloses that the vapor from the intermediate flashing may be purified by removing impurities by absorption in a suitable lean oil. This purified hydrogen can be recycled to the hydrogenation zone. Lehman, however, prefers to use several intermediate flashing stages since the amount of the impurities can be minimized by flashing in stages as this results in greater selectivity in favor of hydrogen vaporization. Thus a given amount of hydrogen recovered by flashing in two or more stages will carry along less impurities than if the same amount of hydrogen were recovered in a single intermediate flash.

Membranes have been proposed for gas separations including the separation of hydrogen from other gases. Henri suggests only that membranes might be useful in processing gases from hydrocracking operations but does not disclose any of the specifics which are necessary in order to provide an operable, efficient hydrocracking process.

MacLean in copending United States patent application Ser. No. 06/243,273, filed concurrently herewith on Mar. 13, 1981, discloses hydrocracking processes exhibiting enhanced efficiencies of hydrogen utilization. In the hydrocracking processes disclosed by MacLean, the hydrocrackate is separated into a liquid phase and a vapor phase at a sufficiently high pressure that the concentration of the hydrogen in the vapor phase is greater than the minimum concentration of hydrogen in the hydrocracking zone. At least a portion of the vapor phase is contacted with the feed side of a polymeric membrane selective to the permeation of hydrogen as compared to methane. The opposite, or permeate, side of the polymeric membrane is maintained sufficiently below the pressure at the feed side of the membrane and to permeate hydrogen to the permeate side of the membrane and to provide a hydrogen permeate having a concentration of hydrogen greater than the concentration in the vapor phase passed to the polymeric membrane and greater than the concentration of hydrogen in the hydrocracking zone. The hydrogen permeate can be compressed and recycled to the hydrocracking zone.

In order for the use of a membrane to provide a hydrogen permeate to be attractive it is necessary that advantageous driving forces for the permeation of hydrogen be achieved. Such advantageous driving forces for the permeation of hydrogen may permit suitable fluxes of hydrogen permeate to be achieved as well as enable relatively small membrane areas to be employed, thereby reducing capital costs of a membrane system. Moreover, high driving forces can enable the desired high concentrations of hydrogen in the permeate to be readily obtained. However, not only must an advantageous driving force for the permeation of hydrogen be provided in order for the use of membranes to be economically attractive, but also, the compression costs for achieving the advantageous driving force and for providing the permeate at a suitable pressure for being returned to the hydrocracking zone can effect its economic viability. Thus, the economical and efficient utilization of a membrane for the recovery of hydrogen is integral with the processing operation.

In accordance with this invention, hydrocracking processes are provided which exhibit an enhanced utilization of hydrogen. In the processes of this invention hydrogen is flashed from a hydrogen-laden liquid phase effluent from a hydrocracking zone under certain conditions such that the flashed hydrogen can be recovered by permeation through polymeric membranes in an efficient and economically-attractive manner. The hydrocracking pressures of this invention thus provide for the co-acting between the separation by flashing and the separation by membrane permeation to enable the efficient and economical use of hydrogen within the hydrocracking processes. Advantageously, the processes can be highly compatible with hydrocracking systems and may even enhance the hydrocracking process and the yield of sought product from the hydrocracking process.

In the processes of this invention, a hydrocarbonaceous feed is cracked in a hydrocracking zone in the presence of hydrogen and a hydrocracking catalyst under hydrocracking conditions. Hydrocracking conditions include a temperature of at least about 250° C. and a pressure of at least about 75 atmospheres absolute. The hydrogen for the hydrocracking is provided in a hydrogen feed gas supplied to the hydrocracking zone in an amount sufficient to promote hydrocracking, and the concentration of hydrogen in the hydrocracking zone is sufficient to prevent unduly rapid deactivation of the hydrocracking catalyst. The effluent from the hydrocracking zone, the hydrocrackate, is passed through a first gas-liquid separation zone which is at a pressure of at least about 75 percent of the pressure in the hydrocracking zone.

In the first gas-liquid separation zone a first separated vapor phase and a first separated liquid phase containing dissolved hydrogen are provided. The first separated liquid phase is then passed to a second gas-liquid sparation zone wherein pressure is reduced from that in the first gas-liquid separation zone. In the second gas-liquid separation zone, the first separated liquid phase is separated into a second separated liquid phase and a second separated vapor phase. In accordance with the invention the second gas-liquid separation zone is maintained at a pressue and temperature sufficient such that the second separated vapor phase has a concentration of hydrogen of at least about 50 volume percent, and a hydrogen partial pressure of preferably at least about 20, e.g., about 20 to 45, atmospheres. Preferably, the pressure in the second gas-liquid separation zone is at least about 35 atmospheres absolute. At least a portion of the second separated vapor phase is brought into contact with one side (feed side) of a polymeric membrane which is highly selective to the permeation of hydrogen as compared to methane. The opposite side (permeate side) of the membrane is maintained at a pressure sufficiently below the pressure of the second separated vapor phase in contact with the feed side of the membrane to permeate hydrogen to the permeate side of the membrane and provide a hydrogen permeate having a concentration of hydrogen greater than the concentration of hydrogen in the second separated vapor phase. Desirably, the ratio of the total pressure on the feed side to the total pressure on the permeate side of the membrane (hereinafter "total pressure ratio") is at least about 3:1. Advantageously, the total pressure on the permeate side of the membrane is at least about 8, say, at least about 10, e.g., about 10 to 20, atmospheres absolute. The non-permeating vapor (non-permeate) is withdrawn from the feed side of the membrane, and the hydrogen permeate is withdrawn from the permeate side of the membrane. At least a portion, preferably at least about 70, most preferably substantially all, of the hydrogen permeate is recycled (with suitable compression) to the hydrocracking zone as a portion of the total hydrogen feed gas to the hydrocracking zone.

In the processes of this invention, the conditions of the second gas-liquid separation zone are such that not only can a significant portion of the hydrogen in the first separated liquid phase be recovered from the liquid phase but also that the separated vapor phase can have a sufficient pressure and hydrogen concentration for attractive recovery of hydrogen by permeation through polymeric membranes. For instance, since the total pressure of the second separated vapor phase may still be relatively high in order to achieve a hydrogen partial pressure of at least about 20 atmospheres, the purification of hydrogen using polymeric membranes is particularly attractive from the standpoint of capital expense and energy consumption. Also, the combination of the high concentrations of hydrogen and the relatively high pressures of the second separated vapor phase, can provide advantageous driving forces for effecting the permeation of hydrogen through membranes.

The processes of this invention have been found to provide many advantages in addition to providing desirable driving forces for the permeation of hydrogen. For instance, the hydrogen condentration of the hydrogen permeate is generally very high due to the high hydrogen concentration of the separated vapor phase fed to the membrane. Thus, this highly-pure hydrogen permeate can off-set the demand for hydrogen from, say, a hydrogen plant to provide a hydrogen feed gas to the hydrocracking zone having an adequate concentration of hydrogen to maintain a desired hydrogen partial pressure in the hydrocracking zone. In accordance with the processes of this invention, desirably high concentrations of hydrogen can be obtained even when the hydrogen permeate is at a desirably high pressure to minimize recompression costs for recycling the hydrogen permeate to the hydrocracking zone. Furthermore, the increased concentration of hydrogen in the hydrogen permeate of the process of this invention can also be utilized to increase the hydrogen partial pressure in the hydrocracking zone and/or increase hydrocarbonaceous feed throughput in the hydrocracking zone. In fact, in some instances, the rate of hydrogen supplied to the hydrocracking zone in the total hydrogen feed gas may be decreased without decreasing the hydrocarbonaceous feed throughput in the hydrocracking zone. Also, higher hydrogen concentrations in the hydrogen feed gas (at a given hydrocarbonaceous feed throughput) can allow the use of lower pressures in the hydrocracking zone. Thus savings in compression expenses may be realized.

The advantages which may be provided by aspects of the processes of this invention may be related not only to the enhanced utilization of hydrogen but also to the removal of potentially deleterious gases in the separated vapor phase. For example, the hydrocarbonaceous feed may contain nitrogen-bearing components which, when cracked, yield free nitrogen. Free nitrogen and hydrogen can react under the hydrocracking conditions to produce ammonia which tends to deactivate many hydrocracking catalysts. The first separated liquid phase may contain nitrogen, and a portion of that nitrogen will be separated from the liquid phase in the second gas-liquid separation zone and thus be contained in the second separated vapor phase. The nitrogen concentration in the second separated vapor phase may often be about 0.1 to 3 volume percent. If this nitrogen-containing separated vapor phase were directly recycled to the hydrocracking zone, a build-up of nitrogen may result which may cause an increase in the production of ammonia and a more rapid deactivation of the catalyst. In an aspect of this invention, the polymeric membrane to which the separated vapor phase is passed, is selective to the permeation of hydrogen as compared to the permeation of nitrogen such that the hydrogen permeate contains very little nitrogen. The recycling of the hydrogen permeate to the hydrocracking zone will not, therefore, result in an undesirable build-up of nitrogen in the hydrocracking zone and the life of the hydrocracking catalyst may be extended.

In further detail regarding the processes of this invention, a hydrocarbonaceous feed is cracked in a hydrocracking zone in the presence of hydrogen and hydrocracking catalyst under hydrocracking conditions. Hydrocarbonaceous feeds suitable for hydrocracking include petroleum or coal-based hydrocarbon stocks. Usually the hydrocarbonaceous feed to a hydrocracking operation results from a fractionation of a crude stock and comprises that fraction boiling above about 200° C. and may include residual stocks having at least about 10 percent by volume boiling above 550° C. Frequently, the hydrocarbonaceous feed to the hydrocracking zone is treated with hydrogen to accomplish desulfurization, demetalization, denitrogenation and the like in order to remove components which may adversely affect the hydrocracking catalyst or may be undesireable in the hydrocrackate.

The hydrocarbonaceous feed is usually below the temperature of they hydrocracking zone and therefore may often be heated to about the temperature of the hydrocracking zone prior to being introduced into the hydrocracking zone. The temperature of the hydrocarbonaceous feed prior to being introduced into the hydrocracking zone is preferably below that which promotes thermocracking, at least prior to the introduction of the hydrocarbonaceous feed into the hydrocracking zone, since thermocracking may often produce cracked products which are less desirable than those obtained through hydrocracking. The temperature of the hydrocracking zone is frequently at least about 250° or 270° C. and may range up to about 700° or 750° C. In most instances, the temperature of the hydrocracking zone is about 300° or 350° C. to about 450° C. Usually the total pressure in the hydrocracking zone is at least about 75, say, about 90 to about 200 or 250 atmospheres absolute.

Generally, the hydrocarbonaceous feed is admixed with at least a portion of the hydrogen feed gas prior to introducing the hydrocarbonaceous feed into the hydrocracking zone in order to ensure a good dispersion of the reactants prior to entering the hydrocracking zone. The hydrogen feed gas is desirably provided in an amount sufficient to effect the hydrocracking reactions and to provide a sufficient hydrogen partial pressure throughout the hydrocracking reaction zone to avoid unduly rapid coking and deactivation of the hydrocracking catalyst. Usually in order to maintain the desired hydrogen partial pressure, the amount of hydrogen provided to the hydrocracking zone is substantially greater than the amount of hydrogen consumed in the hydrocracking reactions. The amount of hydrogen provided to the hydrocracking zone is usually about 0.05 to 10, preferably about 01 to 5 $Nm^3$, normal cubic meters ($Nm^3$) per liter of hydrocarbonaceous feed. The hydrogen feed gas stream frequently contains at least about 75, preferably, at least about 80, volume percent of hydrogen. Generally, with lower pressures in the hydrocracking zone, higher hydrogen concntrations in the hydrogen feed gas are desired. The hydrogen feed gas to the hydrocracking zone is preferably heated to approximately the temperature of the hydrocracking zone prior to being introduced into the hydrocracking zone.

The hydrocarbonaceous feed generally contacts the hydrocracking catalyst at a liquid hourly space velocity (the volume of liquid hydrocarbonaceous feed at 20° C. per volume of catalyst within the reaction zone) of about 0.1 to 10, e.g., about 0.5 to 5, reciprocal hours.

Any suitable hydrocracking catalyst may be utilized, and, generally, hydrocracking catalysts comprise one or more metallic components selected from Groups VI-A and VIII of the periodic table of elements. Frequently the catalyst comprises at least one metal, metal oxide, or metal salt of chromium, molybdenum, tungsten, iron, cobalt, nickel, ruthenium, rhodium, palladium, osmium, iridium, and platinum on a support. The support for the metallic components for hydrocracking catalysts is usually an inorganic oxide, and may preferably be of an acidic nature. Included within suitable inorganic oxides are alumina, silica, crystalline alumina silicates, and the like. The catalyst may, for instance, be in a fixed bed in the hydrocracking zone or moving bed or fluidized bed operations may be employed. Also, the catalyst may be in a suspension and passed through the reaction zone as a slurry. Hydrocracking catalysts and their manner of use are well known to those skilled in the art.

The hydrocracking zone usually contains liquid phase and hydrocracking vapor phase constituents. Preferably, the minimum concentration of hydrogen in the hydrocracking vapor phase is at least about 65 volume percent. The minimum concentration of hydrogen in the hydrocracking vapor phase can frequently be approximated by the concentration of hydrogen in the vapor phase of the hydrocrackate at the conditions of the hydrocracking zone. In many instances, the minimum concentration of hydrogen in the hydrocracking vapor phase is about 65 to 85, say, 70 to 80, volume percent. The hydrocrackate exiting the hydrocracking zone contains substantial amounts of hydrogen both in vapor phase and dissolved in the liquid phase of the hydrocrackate.

The hydrocrackate is passed to a gas-liquid separator (first gas-liquid separation zone) in order to recover a portion of the hydrogen. The first gas-liquid separation zone is maintained at a pressure of at least bout 75 percent of the pressure in the hydrocracking zone. Most frequently, higher pressures are preferred to enhance the concentration of hydrogen in the first separated vapor phase as well as to minimize any recompression costs for recycling the first separated vapor phase to the hydrocracking zone. The first gas-liquid separation zone may be at a pressure greater than that of the hydrocracking zone; however, the expense of compression of the hydrocrackate to higher pressures than those in the hydrocracking zone is generally not economically viable. Hence, the pressure in the first gas-liquid separation zone is often about 0.9 to 1 times the pressure in hydrocracking zone. Most frequently, the pressure in the first gas-liquid separation zone is substantially the same as the pressure in the hydrocracking zone. The temperature in the first separation zone may be substantially the same as the temperature in the hydrocracking zone or may be at a lower temperature. Frequently, the temperature is at least about 20° C., e.g., about 20° to 450° C. In some instances, it may be preferred to effect the separation of the liquid phases and the vapor phases in several steps. For instance, in a first gas-liquid separator vessel the separation of phases may be conducted at substantially the same conditions of temperature and pressure as those in the hydrocracking zone. The vapor phase from the first gas-liquid separator vessel may then be cooled, e.g., to about 20° to 70° C., to condense higher boiling moieties and then passed to another gas-liquid separator in order to obtain a separated vapor phase and another separated liquid phase which can, if desired, be combined with the liquid phase from the first gas-liquid separator vessel. Any suitable gas-liquid separation apparatus may find use in the first gas-liquid separation zone, such as knock-out pots (gravity separators), impingement separators, cyclonic separators, and the like.

The first separated liquid phase from the first gas-liquid separation zone contains a substantial amount of dissolved hydrogen. The amount of hydrogen dissolved in the first separated liquid phase, of course, will depend upon the pressures and temperatures used in the first gas-liquid separation zone. Additional hydrogen is recovered from this hydrogen-laden first separated liquid phase in a second gas-liquid separation zone. The second gas-liquid separation zone is at a lower pressure than that in the first gas-liquid separation zone. The pressure of the second gas-liquid separation zone is sufficiently low that a substantial portion of the hydrogen dissolved in the first separated liquid phase is flashed. Hence, the pressure in the second gas-liquid separation zone is less than about 75, say, about 30 to 75, e.g., 35 to 60, percent of the pressure in the first gas-liquid separation zone. Often, at least about 40 percent of the dissolved hydrogen in the first separated liquid phase is flashed in the second gas-liquid separation zone. However, the pressure and temperature in the second gas-liquid separation zone are sufficient such that the second separated vapor phase has a concentration of hydrogen of at least about 50, preferably, at least about 55, volume percent. In order to enable the desired recovery and purity of hydrogen in the hydrogen permeate the pressure in the second gas-liquid separation zone is maintained at a pressure of at least about 35, say, at least about 40, frequently, about 40 to 80, atmospheres absolute. In most instances, it is preferred to operate the second gas-liquid separation zone at a temperature of less than about 70° C., e.g., about 20° to 70° C., say, about 20° C. to 50° or 55° C. to provide wide flexibility in selecting the pressure which would provide the desired concentration of hydrogen in the second separated vapor phase consonant with the sought recovery of hydrogen from the first separated liquid phase. As with the first gas-liquid separation zone, any suitable apparatus may be utilized to effect gas-liquid separation in the second gas-liquid separation zone.

Usually, at least about 80, e.g., at least about 85, preferably about 85 to 95 or more, percent of the hydrogen in the hydrocrackate is recovered in the first and second gas-liquid separation zones.

At least a portion, e.g., at least about 25 or 50, preferably all, of the second separated vapor phase is brought into contact with the feed side of a polymeric membrane which is highly selective to the permeation of hydrogen as compared to methane to provide a hydrogen-rich hydrogen permeate. Also, the second separated vapor phase may be processed in another gas-liquid separator, e.g., a knock-out pot, cyclone separator, or impingement separator to remove entrained liquids. Most desirably, the entrained liquids are removed prior to contact of the second separated vapor phase with the polymeric membrane. The temperature of second separated vapor phase is preferably below that temperature which may adversely affect the polymeric membrane. Usually, the temperature of the second separated vapor phase contacting the polymeric membrane is less than about 125° C., e.g., less than about 65° C., and is often about 10° to 60° C., preferbly at least about 20° or 25° to 55° C.

The polymeric membranes should exhibit high selectivities of separation of hydrogen from methane. Generally, the selectivity of separation of a membrane (separation factor) is described in terms of the ratio of the permeability of the fast permeating gas (e.g., hydrogen) to the permeability of the slow permeating gas (e.g., methane) wherein the permeability of the gas through the membrane can be defined as the volume in cubic centimeters of gas at standard temperature and pressure, which passes through a membrane per square centimeter of surface area, per second, at a partial pressure differential of 1 centimeter of mercury across the membrane. Frequently, the separation factor of suitable polymeric membranes in accordance with this invention is at least about 15 or 20 for the separation of hydrogen over methane. In many instances, the separation factor for hydrogen over methane is at least about 25. However, particularly with membranes exhibiting separation factors of greater than about 20 or 25, it is often preferred that the membrane be selected on its ability to quickly permeate hydrogen rather than on its selectivity of separation. Clearly, the higher the permeability of hydrogen through a polymeric membrane, the less membrane surface area required under given conditions to permeate a desired amount of hydrogen through the polymeric membrane. Particular desirable membranes exhibit hydrogen permeabilities of at least about $1 \times 10^{-6}$, preferably at least about $20 \times 10^{-6}$, cubic centimeters of hydrogen (STP) per square centimeter of membrane surface area per second at a partial pressure differential of 1 centimeter of mercury across the membrane, at 25° C. Frequently, the polymeric membranes exhibit separation factors for hydrogen over nitrogen of at least about 15, e.g., at least about 20.

In order to effect the permeation of hydrogen through the polymeric membrane, a driving force for the permeation must exist. According to current theory, this driving force is a differential in fugacities of hydrogen across the polymeric membrane. Since fugacities for ideal gases are approximated by partial pressures, conveniently the driving force is referred to in terms of partial pressure differentials. Partial pressures are related to the concentration of a moiety in a gas and the total pressure of the gas, and thus these parameters can be varied jointly or separately to provide suitable partial pressure differentials across the membrane in order to provide desirable permeation fluxes. Because the second separated vapor phase already contains a high concentration of hydrogen and is at a high pressure, the second separated vapor phase has an advantageously high partial pressure of hydrogen to enable desirable driving forces for hydrogen permeation to readily be achieved. Moreover, large driving forces for the permeation of hydrogen can often be provided without the need to maintain the permeate side of the membrane at such low total pressures that an undue amount of compression is required to increase the pressure of the hydrogen permeate for reintroduction into the hydrocracking zone. Preferably, the total pressure ratio (feed side pressure/permeate side pressure) is at least about 3:1, e.g., about 4:1 to 10:1, to provide desirable recoveries of hydrogen at suitable hydrogen concentrations in the permeate without the need for excessive membrane surface area. The product of the total pressure ratio and the mole percent of hydrogen in the second separated vapor phase is frequently at least about 180, say, at least about 200. Thus, with greater hydrogen concentrations in the second separated vapor phase, lower total pressure ratios may be more acceptable than if the hydrogen concentration of the second separated vapor phase were lower.

The large driving forces for hydrogen permeation which are obtainable in the processes of this invention can, for instance, result in advantageous rates of permeation of hydrogen and thus excessive membrane surface area need not be required to obtain a desired amount of hydrogen permeate. Moreover, the large driving forces can also enhance the hydrogen purity in the permeate stream. It should generally be noted that the recovery of hydrogen from the second separated vapor phase and the purity of hydrogen in the hydrogen permeate are interrelated. For instance, the purity of the hydrogen in the permeate stream decreases with increased recovery of hydrogen from the second separated vapor phase contacting the membrane.

The permeate stream from the polymeric membrane has a hydrogen purity greater than that of the second separated vapor phase. The increase in hydrogen purity which is achieved will depend, in part, upon the concentration of hydrogen in the second separated vapor phase, the selectivity of the polymeric membrane, the permeability of the polymeric membrane to hydrogen, the effective membrane surface area (i.e., that membrane surface area available for effecting separations), and the driving force for the permeation of hydrogen. One method for expressing the increase in hydrogen purity is in terms of the contaminant reduction ratio which is defined as the ratio obtained by dividing the difference between 100 and the hydrogen purity in percent of the hydrogen permeate ($H_2\%_{PS}$) by the difference between 100 and the hydrogen purity in percent of the vapor phase ($H_2\%_{FG}$)

Contaminant reduction
ratio=$(100-H_2\%_{PS})/(100-H_2\%_{FG})$

Frequently the contaminant reduction ratio is less than about 0.8, preferably, less than about 0.6, say, about 0.02 to 0.5. Desirably, the concentration of hydrogen in the hydrogen permeate is at least about 75, say, at least about 80, e.g., about 85 to 99, volume percent. Often the concentration of hydrogen in the permeate stream is at least as high as the concentration of hydrogen in the hydrogen feed gas to the hydrocracking zone.

The percentage of the hydrogen in the second separated vapor phase which permeates the polymeric membrane will depend on the amount of hydrogen desired in the hydrogen permeate and the required hydrogen purity. Usually, the percentage of hydrogen permeating is at least about 50, say, at least about 70, often about 70 to 95, percent of the hydrogen in the second separated vapor phase contacting the membrane.

The hydrogen permeate which is recovered from the permeate side of the polymeric membrane can be removed and, preferably, without additional recompression be admixed with a hydrogen-containing stream providing another portion of the hydrogen feed gas to the hydrocracking zone (make-up hydrogen stream). In order to facilitate introduction of the hydrogen permeate to the make-up hydrogen stream, the make-up hydrogen stream should be at a slightly lower total pressure than the total pressure of the hydrogen permeate.

The non-permeate stream from the membrane may be used for any suitable purpose. For instance, hydrocarbon products may be recovered from the non-permeate stream, the non-permeate stream may be used as a feed to a petroleum or petrochemical conversion operation or the non-permeate stream may be used for fuel. Since the non-permeate stream can be at essentially the same pressure as the second separated vapor phase in contact with the polymeric membrane, significant amounts of energy can be recovered from it by, for instance, the use of a turbine.

Polymeric membranes, which may provide suitable separation factors for hydrogen over methane and hydrogen over nitrogen, may include membranes of organic polymer or organic polymer mixed with inorganics such as fillers, reinforcements, etc. Polymers which may be suitable for the polymeric membranes can be substituted or unsubstituted polymers and may be selected from polysulfones; polystyrenes, including styrene-containing copolymers such as acrylonitrile-styrene copolymers, styrene-butadiene copolymers and styrene-vinylbenzylhalide copolymers; polycarbonates; cellulosic polymers, such as cellulose acetate, cellulose propionate, ethyl cellulose, methyl cellulose, nitro-cellulose, etc.; polyamides and polyimides, including aryl polyamides and aryl polyimides; polyethers, poly(arylene oxides) such as poly(phenylene oxide) and poly(xylylene oxide); poly(ester-amide-diisocyanate); polyurethanes; polyesters (including polyarylates), such as poly(ethylene terephthalate), poly(alkyl methacrylates), poly(alkyl acrylates), poly (phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyacetal; polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above, and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Generally, aromatic-containing polymers are preferred for the polymeric membranes due to their strength and due to the relatively high chemical resistance of these membranes to moieties in the second separated vapor phase, especially lower paraffins which usually are the predominant hydrocarbons in the second separated vapor phase. Particularly preferred polymers include aromatic-containing polysulfones, polycarbonates, poly(arylene oxides), polyamides and polyimides. Some useful aromatic-containing polymers have both aliphatic and aromatic carbons, such as polymers containing bisphenol A-derived units within their polymeric backbones.

Since the rate of permeation through a polymeric membrane is affected by the thickness of the membrane through which a permeating moiety must pass, the membrane is preferably as thin as possible yet sufficiently thick to provide adequate strength to the membrane to withstand the separation conditions. The membrane may be isotropic, i.e., have substantially the same density throughout, or may be anisotropic, i.e., have at least one zone of greater density than at least one other zone of the membrane. Anisotropic membranes are frequently advantageous since a moiety need only pass through a portion of the overall structural thickness of the polymeric membrane. The polymeric membrane may be chemically homogeneous, i.e., constructed of the same material, or may be a composite membrane. Suitable composite membranes may comprise a thin layer which effects the separation on a porous physical support which provides the necessary strength to the membrane to withstand membrane separation conditions but offers little resistance to gas flow. Other suitable composite membranes are the multicomponent membranes such as disclosed by Henis, et al., in U.S. Pat. No. 4,230,463, herein incorporated by reference. These membranes comprise a porous separation membrane which substantially effects the separation and a coating material in occluding contact with the porous separation membrane. These multicomponent membranes are particularly attractive for gas separations in that good selectivity of separation and high flux through the membrane can be obtained. The materials for the coating of the multicomponent membranes such as disclosed by Henis, et al., may be natural or synthetic substances, and are often polymers, and advantageously exhibit the appropriate properties to provide occluding contact with the porous separation membrane.

A permeator containing the polymeric membrane may be of any suitable design for gas separations, e.g., plate and frame, spiral wound film membranes, tubular membranes, hollow fiber membranes, or the like. Preferably, the permeator utilizes hollow fiber membranes due to the high membrane surface area per unit volume which can be obtained with hollow filaments. When the membranes are in tubular or hollow fiber form, a plurality of the membranes can be substantially arranged in parallel in a bundle and the second separated vapor phase can be brought into contact with either the outside (shell side) or the inside (bore side) of the membrane. Preferably, the second separated vapor phase is contacted with the shell side of the membranes since passage of the second separated vapor phase through the bore side of the membranes may involve substantially greater pressure losses to the second separated vapor phase, which pressure losses can detract from the driving force for permeation and may unduly reduce the pressure of the non-permeate stream. Since the concentration of hydrogen on the feed side of the membrane is continually diminishing as hydrogen permeates to the permeate side of the membrane, the hydrogen partial pressure differential across the membrane is continually changing. Therefore, flow patterns in the permeator can be utilized to provide desirable recoveries of hydrogen from the second separated vapor phase. For instance, the flows of the second separated vapor phase and the hydrogen permeate can be concurrent or countercurrent. With bundles of hollow fiber or tubular membranes, the shell side feed can be radial, i.e., the second separated vapor phase transversely flows past the membranes either to the inside or, usually, the outside of the bundle, or the flow can be axial, i.e., the second separated vapor phase dispersed within the bundle and generally flows in the direction in which the hollow fibers or tubular membranes are longitudinally oriented.

Hollow fibers are a preferred configuration for polymeric membranes. Generally, the hollow fibers have an essentially cylindrical configuration with an outside diameter of about 50 to 1000, preferbly, about 100 to 800, microns, and a concentric bore such that the ratio of the wall thickness to outside diameter is about 0.1 to 0.45, say, about 0.15 to 0.35.

An understanding of the invention may be facilitated by reference to the attached drawing which is a schematic representation of one type hydrocracking system utilizing processes of this invention. The schematic diagram and its description are not intended to be a limitation of the scope of this invention. It is to be understood that some valves, pumps, compressors, separators, reboilers and the like have been deleted from the schematic diagram for purposes of clarity.

A hydrocracker of a known type, designated by the numeral 10, receives a hydrocarbonaceous feed via a line 12 to form a hydrocrackate in a known manner. The hydrocrackate exits the hydrocracker 10 via a line 14 and passes to a heat exchanger 16 from which a cooled hydrocrackate is obtained. The cooled hydrocrackate passes through a line 18 to a first separation zone 20 from which a first separated vapor phase and a first separated liquid phase are obtained. As depicted, the first separated vapor phase is removed via a line 22 and the first separated liquid phase is removed via a line 24 from the first separation zone 20. The first separated liquid phase enters a second separation zone 26 from which a second separated liquid phase is obtained and removed from the hydrocracking system via a line 28. The second separated vapor phase exits the second separation zone 26 via a line 30, is heated in a heat exchanger 32 to a temperature suitable to provide for the desired operation of a permeator 34, and then is passed to the permeator 34.

As depicted, the permeator 34 is a single ended permeator having the second separated vapor phase contact the exterior of the membranes contained therein. FIG. 5 of U.S. Pat. No. 4,172,885, herein incorporated by reference, schematically depicts a single-ended permeator. The membranes are conveniently in the form of hollow fibers and a hydrogen permeate is withdrawn from the interior of the hollow fibers. The non-permeating gas (i.e., the hydrogen depleted gas) is removed from the permeator 34 via a line 36. The hydrogen permeate is withdrawn from the permeator 34 via a line 38.

Make-up hydrogen from a hydrogen providing source from within the refinery (which may be from a catalytic reformer) is passed via a line 40 to the hydrocracker system. As depicted, the make-up hydrogen of the line 40 is combined with relatively pure hydrogen from a hydrogen plant (not shown) via a line 42. These combined gases are further combined with the hydrogen permeate from the line 38 and are passed to a compressor 44 which sufficiently elevates the pressure of the gases for combination with the first separated vapor phase from the line 22. The total combined gases are then compressed in a combination 46 to a pressure sufficient for introduction into the line 12 to be admixed with the hydrocarbonaceous feed and introduced into the hydrocracker 10.

In order to facilitate an understanding of the invention, the following example is provided. To enable the important parameters influenced by the invention to be readily discerned, the example does not recite the myriad of details of the hydrocracking process which are well known to those skilled in the hydrocracking art. All parts and percentages of solids and liquids are by weight and of gases are by volume unless otherwise stated.

In a hydrocracking system such as depicted in the drawing, a straight-run hydrocarbonaceous feed stock (340° to 540° C. cut) is fed to the hydrocracking zone at a rate of about 120,000 kilograms per hour. Approximately 46,000 kilograms per hour of recycled higher boiling liquid phase obtained by distilling the hydrocrackate are also recycled to the hydrocracking zone. The make-up hydrogen to the hydrocracking zone is obtained from a catalytic reformer off-gas containing about 85 volume percent of hydrogen and is provided in an amount sufficient to provide about 5600 kilograms per hour of hydrogen. The hydrocracking vessel is at a pressure of about 150 atmospheres absolute and a temperature of about 400° C.

Approximately 216,000 kilograms per hour of hydrocrackate containing about 8500 kilograms per hour of hydrogen exit the hydrocracking zone, are cooled and passed to a first gas-liquid separation zone at a temperature of about 45° C. and a pressure of about 142 atmospheres absolute. A first separated vapor phase containing about 80 volume percent of hydrogen is produced in the first gas-liquid separation zone and provides about 8200 kilograms per hour of hydrogen which is recycled to the hydrocracking zone. The liquid phase contains about 365 kilograms per hour of hydrogen.

The pressure of the liquid phase is reduced to about 42.5 atmospheres absolute, and the liquid phase is passed to a second gas-liquid separation zone. The separated vapor phase contains about 250 kilograms per hour of hydrogen, and its hydrogen concentration is about 65 volume percent. The separated vapor phase is heated to about 55° C., and then is split into 7 substantially equal streams, with each stream being passed to a single-ended permeator containing hollow fiber membranes providing about 375 square meters of effective membrane surface area. The hollow fiber membranes are polysiloxane-coated anisotropic polysulfone hollow fibers such as disclosed in U.S. Pat. No. 4,230,463 to Henis, et al. The hollow fiber membranes exhibit a hydrogen permeability at 25° C. of about $8 \times 10^{-6}$ cubic centimeters of hydrogen (STP) per square centimeter of membrane surface area per second per centimeter of mercury partial pressure differential. The separation factor for hydrogen over methane is about 35. The permeate side of the permeators is at a pressure of about 14.5 atmospheres absolute. The hydrogen permeate contains about 88 volume percent hydrogen and provides about 225 kilograms per hour of hydrogen which is combined with the make-up hydrogen compressed and introduced into the hydrocracking zone.

It is claimed:
1. A process for catalytically hydrocracking a hydrocarbonaceous feed comprising:
   a. cracking in a hydrocracking zone the hydro-carbonaceous feed in the presence of hydrogen and a hydrocracking catalyst under hydro-cracking conditions comprising a temperature of at least about 250° C. and a pressure of at least about 75 atmospheres absolute to produce a hydrocrackate wherein the hydrogen is provided in a hydrogen feed gas, said hydrogen feed gas being provided in an amount sufficient to promote hydrocracking and having a concentration of hydrogen sufficient to prevent unduly rapid deactivation of the hydrocracking catalyst;
b. passing the hydrockrackate to a first gas-liquid separation zone, said first gas-liquid separation zone being at a pressure of at least about 75 percent of the pressure in the hydrocracking zone;
c. separating the hydrockrackate in the first gas-liquid separation zone into a first separated vapor phase and a first separated liquid phase;
d. passing the first separated liquid phase to a second gas-liquid separation zone, the pressure of said first separated liquid phase in said second zone being between about 35 atmospheres absolute and the pressure of said first zone;
e. separating the first separated liquid phase in the second gas-liquid separation zone into a second separated liquid phase and a second separated vapor phase, said second gas-liquid separation zone being maintained at a pressure and temperature sufficient such that the second separated vapor phase has a concentration of hydrogen of at least about 50 volume percent and a hydrogen partial pressure of at least about 20 atmospheres;
f. contacting at least a portion of the second separated vapor phase with a feed side of a polymeric membrane exhibiting a separation factor of hydrogen over methane of at least about 15;
g. maintaining the opposite side of the membrane at a pressure sufficiently below the pressure of the second separated vapor phase contacting the feed side of the membrane to permeate at least 70 percent of the hydrogen from the vapor phase to the opposite side of the membrane and to provide a hydrogen permeate having a concentration of at least 80 volume percent at a pressure of at least 8 atmospheres absolute, the ratio of the total pressure on the feed side of the membrane to the total pressure on the opposite side of the membrane being at least about 3:1;
h. withdrawing non-permeate from the feed side of the membrane; and removing the hydrogen permeate from the opposite side of the membrane; and
i. recycling at least a portion of the hydrogen permeate to the hydrocracking zone as a portion of the hydrogen feed gas.

* * * * *